United States Patent [19]
Miller et al.

[11] Patent Number: 5,819,058
[45] Date of Patent: Oct. 6, 1998

[54] INSTRUCTION COMPRESSION AND DECOMPRESSION SYSTEM AND METHOD FOR A PROCESSOR

[75] Inventors: Richard G. Miller, Los Altos Hills; Louis A. Cardillo, Palo Alto; John G. Mathieson, Los Gatos; Eric R. Smith, Sunnyvale, all of Calif.

[73] Assignee: VM Labs, Inc., Los Altos, Calif.

[21] Appl. No.: 808,735

[22] Filed: Feb. 28, 1997

[51] Int. Cl.$^6$ ....................................................... G06F 9/30
[52] U.S. Cl. ........................................................... 395/386
[58] Field of Search ........................ 364/DIG. 1 MS File, 364/DIG. 2 MS File; 341/50, 55, 78; 395/376, 379, 380, 381, 384, 385, 386, 800.01, 800.24

[56] References Cited

U.S. PATENT DOCUMENTS

5,057,837  10/1991  Colwell et al. ............................ 341/55

*Primary Examiner*—Robert B. Harrell
*Attorney, Agent, or Firm*—Gray Cary Ware & Freidenrich

[57] ABSTRACT

A system and method for compressing and decompressing variable length instructions contained in variable length instruction packets in a processor having a plurality of processing units is provided that has a compression system with a system for generating an instruction packet containing a plurality of instructions, a system for assigning a compressed instruction having a predetermined length to an instruction within the instruction packet, a shorter compressed instruction corresponding to a more frequently used instruction, and a system for generating an instruction packet containing compressed instructions for corresponding ones of said processing units. The decompression system has a system for storing a plurality of said instruction packets in a plurality of storage locations, a system for generating an address that points to a selected variable length instruction packet in the storage system, and a decompression system that decompresses said compressed instructions in said selected instruction packet to generate a variable length instruction for each of said processing units. The decompression system may also have a system for routing said variable length instructions from the decompression system to each of said processing units.

34 Claims, 8 Drawing Sheets

INSTRUCTION COMPRESSION AND DECOMPRESSION SYSTEM AND METHOD FOR A PROCESSOR

BACKGROUND OF THE INVENTION

This invention relates generally to a system and method for reducing storage space for instructions within a processor, and in particular to a system and method for compressing and decompressing very long instruction words that are stored in a memory within a processor.

Certain tasks, such as real-time digital signal processing, real-time video processing, and real-time image decompression require high speed processing systems that quickly process, in real time, significant amounts of data, such as pixel display data. These high speed processing systems may employ complex processors, e.g., very long instruction word (VLIW) processors that process, for example, five individual instructions for five individual functional units every clock cycle. These processors use very long instruction words, up to 150 bits in length, and it requires a large amount of memory to store these very long instruction words. A very large amount of memory to store these very long instruction words is expensive. For typical VLIW processors, these very long instruction words may be up to 150 bits in length. Although these very long instruction words permit, for example, five processing units to simultaneously process five separate pieces of data, it is difficult to store very long instruction words. In addition, it is not always possible to fully utilize all of the multiple functional units during every clock cycle. However, because a typical VLIW processor has a fixed number of bits assigned to each functional unit for every dock cycle, when there is an idle functional unit, some of the bits within the very long instruction word are wasted. Due to the wasted bits within the very long instruction word, memory storage space is also wasted. Due to the wasted memory space, even a simple program might fill up the instruction memory because the instruction words are so large. In addition, more complex programs, such as video decompression programs or image generation programs, may be incapable of being stored entirely in the instruction memory and would have to be continually reloaded into the memory. The continual reloading of the program into memory slows down the speed of the processor to unacceptable levels.

Thus, there is a need for a system and method for reducing the amount of memory required to store a very long instruction word. One conventional processing system that has only two processing units, such as a memory unit and an arithmetic unit, has separate instructions for each of the processing units that are stored in a memory. Then, when the processor is ready to accept another instruction, it is determined whether two adjacent instructions may be combined together before they enter the processor based on certain criteria. To combine adjacent instructions, the instructions must be a memory instruction (i.e., load or store) and an arithmetic logic unit instruction. A combined instruction may be processed more rapidly by the processor. Although this system increases the processing speed of the processor, it entails processing overhead and does not reduce the amount of memory required for an instruction since the full length instructions are stored in the memory.

There are also conventional VLIW processor systems wherein there are both short instructions, e.g., 40 bits, and long instructions, e.g., 80 bits. The short instructions are used to initiate loops, while the long instruction words are used for the actual inner loops. This choice of short and long instructions also provides increased processing speed and may reduce the size of certain instructions, but does not adequately address the problem of reducing instruction memory space. Another VLIW processor system uses an instruction cache, wherein parts of the instruction cache are dedicated to each of the processing units in the system. Once again, this system speeds up the processing of the instructions. This system also reduces the instruction memory space, but there are still wasted bits in the very long instruction word. A further VLIW system groups various types of instructions together to increase parallelism and processing speed, but does not address the instruction memory space concerns. Yet another VLIW system has variable length instructions that are contained within a fixed length instruction packet. None of these systems provide a way to efficiently reduce the memory size required to store very long instruction words. Thus, these conventional systems are expensive and cannot store complex programs entirely within the instruction memory of the system due to the large size of the very long instruction words.

Therefore, there is a need for a system and method that reduces the amount of memory required to store very long instruction words, and which avoid these and other problems of known devices, and it is to this end that the invention is directed.

SUMMARY OF THE INVENTION

The invention addresses the foregoing and other problems by providing a system and method for reducing the amount of memory required to store very long instruction words in a VLIW processor. The invention accomplishes this by reducing the size of the very long instruction words that must be stored in the memory, by compressing these very long instruction words to reduce their size. The invention may generate and store a number of compressed instructions for each of multiple processing units in a format, known as an instruction packet, that may then be decompressed just prior to execution by the processing units. The instructions may be compressed (i.e., the size of each instruction is reduced) in a number of ways. For example, there are typically some unused bits within an instruction packet. The unused bits exist, for example, because a full 32-bit long processing unit instruction is used even if the processing unit is idle and may be executing a no operation instruction or a default instruction. A no operation instruction may be no instruction, while a default instruction may be, for example, having the multiply functional unit multiply its two inputs together. A default or no operation instruction, however, does not require a full 32 bits. In a typical VLIW processor system, only about ½ of the processing units are actually processing valid instructions at any given time. The other half of the processing units are processing default instructions. Each of these default instructions, as described above, may be shortened. Thus, because some of the processing units are executing default instructions, the very long instruction word may be compressed, in accordance with the invention. In addition, most instructions executed by the processing units do not need to use all of the bits available within the very long instruction word so these bits may be compressed. In addition, instructions may also be compressed by assigning a short code to each longer instruction, including default instructions, and then expanding these codes at execution time.

An instruction compression and decompression system and method in accordance with the invention is provided wherein an instruction packet is generated that contains a plurality of instructions, a compressed instruction having a predetermined length is assigned to an instruction within the instruction packet. Shorter compressed instructions are used for more frequently occurring instructions. An instruction packet containing compressed instructions is generated and when decompressed it will control the operation of each of said processing units. The decompression occurs by storing a plurality of said instruction packets in a plurality of storage locations, generating an address that points to a selected variable length instruction packet in the storage system, and decompressing said compressed instructions in said selected instruction packet to generate a variable length instruction for each of said processing units. The invention may also route said decompressed variable length instructions to each of said processing units.

DETAILED DESCRIPTION OF A PREFERRED EMBODIMENT

The invention is particularly applicable to a system for reducing the size of the instruction memory in a processor, and in particular to a system for compressing and decompressing very long instruction words in a VLIW processor. It is in this context that the invention will be described. It will be appreciated, however, that the system and method of the invention have greater utility.

Figure 1:
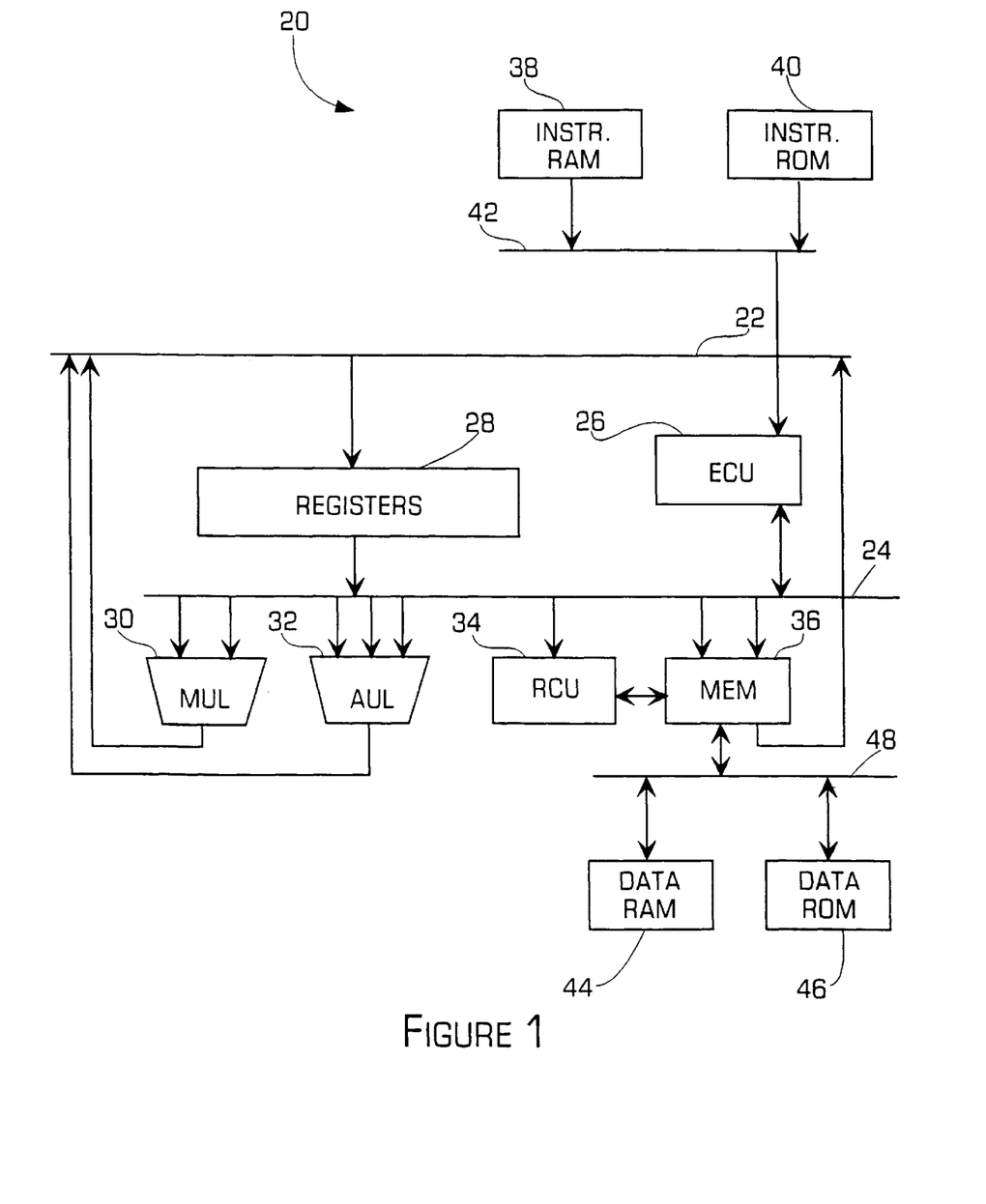
FIG. 1 is a block diagram of a pipeline processor containing multiple processing units.

FIG. 1 is a diagram of a very long instruction word (VLIW) processor 20 that may include an instruction compression and decompression system in accordance with the invention. The VLIW processor 20 may include a operation code source bus 22 and a result bus 24 that electrically interconnect a plurality of system units, such as an execution control unit (ECU) 26, a set of registers 28, a multiplier unit (MUL) 30, an arithmetic logic unit (ALU) 32, a register control unit (RCU) 34, and a memory unit (MEM) 36. The invention is not limited to the architecture shown, and may include, for example, more than one MUL, but it may also include, for example, no ALU. The ECU, MUL, ALU, RCU and MEM units are known as processing units. In the VLIW processor, the processing units may be connected together in parallel so that each processing unit may simultaneously process an instruction contained in the very long instruction word. The ECU 26 controls the retrieval and execution of instructions within the VLIW processor. The registers 28 store data being utilized by the various processing units within the processor, the MUL unit 30 multiplies two pieces of data from two registers and stores the product value in another register, and the ALU 32 performs various arithmetic functions and logical operations on pieces of data. The RCU 34 controls certain special registers, and the MEM unit 36 controls the access of the other processing units to the various storage systems within the processor. Generally, the VLIW processor shown may execute up to five (5) instructions every clock cycle because each of the processing units described above may execute separate instructions simultaneously.

The ECU 26 is also connected to a plurality of instruction memories 38, 40 by an instruction memory bus 42. The instruction memories may be a random access memory (RAM) 38, and a read only memory (ROM) 40. These memories may also be any other type of storage device, such as flash memory, or an electrically erasable programmable read only memory (EEPROM). These instruction memories store the instructions, as very long instructions words, that are routed to the various processing units by the ECU unit. The instruction ROM 40 may store frequently used instructions so that these instructions never need to be stored in the RAM.

The MEM unit 36 is connected to data memories 44, 46 by a data memory bus 48. The data memories 44, 46 may be a RAM and a ROM, but may also be any other type of memory, such as an erasable programmable read only memory (EPROM), a flash memory, or an EEPROM. These data memories store the data that is being operated on by the VLIW processor. The data ROM 46 may store data or data structures that are frequently used by the VLIW processor. To control all of these processing units simultaneously, a very long instruction word, such as shown in FIG. 2, may be used.

Figure 2:
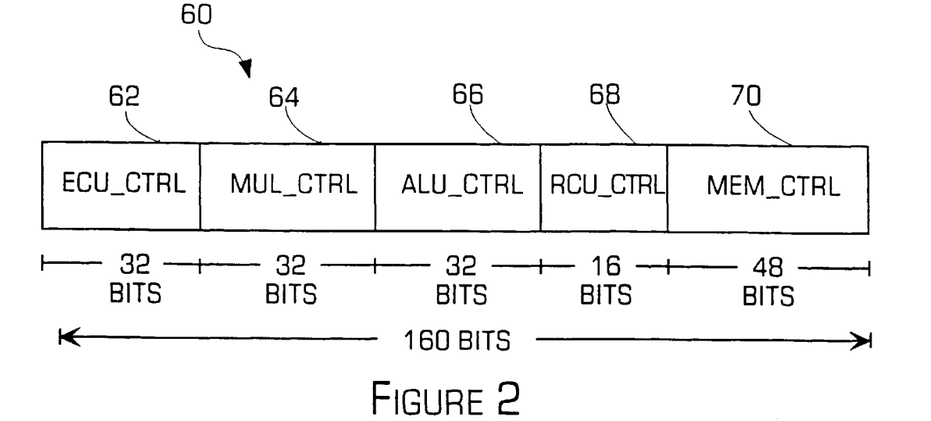
FIG. 2 is a diagram of a very long instruction word that may be used to control the processing units shown in FIG. 1.

FIG. 2 is a diagram of an example of a very long instruction word 60 that may be used to control all of the processing units shown in FIG. 1. The invention is not limited to any particular order of the instructions within the very long instruction word, or any particular number of instructions within the very long instruction word. For example, a VLIW processor may have two MUL units so that each very long instruction word may have two MUL instructions. The very long instruction word may be formed by a large number of bits, e.g., 160, and comprise portions that contain the plurality of instruction words that individually control individual ones of the processing units. For example, ECU_CTRL may be a 32-bit instruction word 62 that controls the ECU unit. An MUL_CTRL instruction word 64 may control the MUL unit and may also be 32 bits long. An ALU_CTRL instruction word 66 may control the ALU unit and may also be 32 bits long. An RCU_CTRL instruction word 68 may control the RCU unit and may be 16-bits long. Finally, a MEM_CTRL instruction word 70 may control the MEM unit and may be up to 64 bits long. The formats of each of these instruction word for each processing unit are well known in the art and follow the RISC style of processor architecture in which there is little or no processing between the instruction word and the control signals for the processing units. As shown, all of these instruction words are combined together to form a very long instruction word. This very long instruction word may be up to 160-bits long. The invention is not limited to any particular length of very long instruction word since a VLIW processor with more processing units may have a longer very long instruction word. As shown, these various instruction words 62–70 may be combined to form the VLIW 60. As will be appreciated, if the instruction memories 38 and 40 had to store a large number of such VLIWs, as would be the case for complex programs, this would necessitate very large sized memories. The invention avoids this by providing a system and method for compressing and decompressing this very long instruction word as will be described.

Figure 3A:
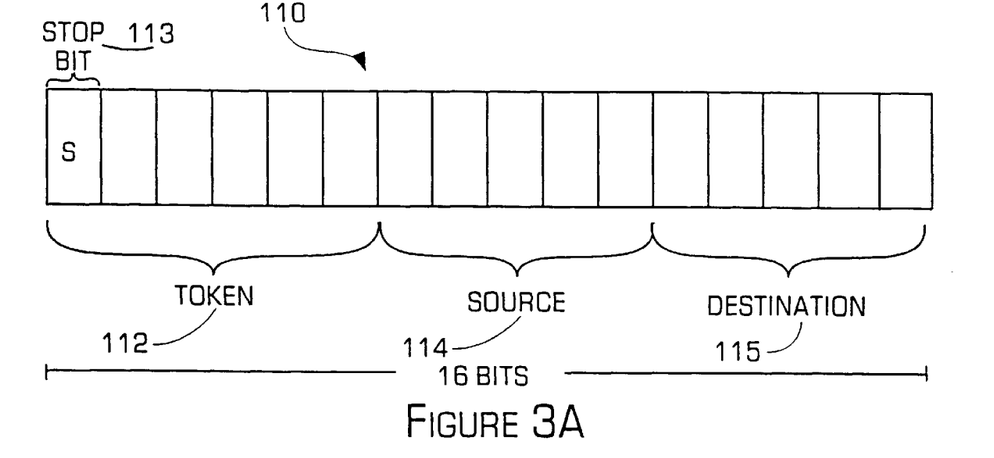
FIGS. 3A and 3B are diagrams illustrating two different formats of a compressed instruction in accordance with the invention.

FIG. 3A is a diagram of the format of a compressed instruction word 110 in accordance with the invention for an individual one of the processing units. The compressed instruction word shown is a 16-bit form. The compressed instruction word may also have a 32-bit and a 48-bit form that have a similar format and will be described below with reference to FIG. 3B, and a 0-bit format (the default instruction). The 0-bit compressed instruction will be described below. Preferably, the shorter length compressed instruction words are assigned to the more frequently occurring uncompressed instruction words, since this results in the largest amount of compression of the most frequently used instructions. For example, 16-bit forms may be used for a majority of the instructions and then the longer forms (32 bits long, 48 bits long or 64 bits long) are used for all other instructions. Some instructions use the longer forms because some data, such as immediate data, cannot be fit into the 16-bit compressed instruction. The 16-bit compressed instruction word 110 may include a token field 112 that may include a stop bit 113, a source register field 114, and a destination register field 115. The number of bits assigned to the token, source register, and destination register fields may be changed, and the compressed instruction shown is merely an example. The stop bit is set to "1" if this particular instruction is the last instruction within a compressed instruction packet. If the instruction is not the last instruction in an instruction packet, then the stop bit is not set (i.e., it is "0"). Thus, for a 16 bit compressed instruction, the stop bit indicates to the ECU unit and processor where one compressed instruction packet ends and the next compressed instruction packet begins.

The token field 112, which may be five (5) bits wide, stores a token that corresponds to an operations ("op") code, a control word, and a form word of an uncompressed instruction. The tokens are selected so that each token corresponds to only one uncompressed instruction in the instruction set. Thus, the token field permits the decompression system, as described below, to determine both the processing unit that is affected by the instruction as well as the actual instruction for that processing unit. The token field, in effect, both identifies the processing unit and identifies the actual uncompressed instruction. The token may be assigned to uncompressed instructions in any manner, however, the most compression occurs, as described above, when the shortest instruction words are assigned to the most frequently used instructions.

The source register field 114, which may be five (5) bits, may determine which register within the processor is being used to store the source data for the instruction. A source register address from the uncompressed instruction is compressed and put into this source register field. In this embodiment, since the source field has 5 bits, up to 32 registers ($2^5$=32) may be specified. Similarly, the destination register field 118 may have 5 bits so that it may also specify up to 32 registers. A destination register address from an uncompressed instruction is compressed and put into this field. The invention, however is not limited to any particular size fields within the compressed instruction.

In addition to the op code, source register address, and destination register address, there may be other bits, such as a control word or a form of the op code, within the uncompressed instruction that may be encoded into the token field and then regenerated by the decompression system, as described below. To further increase the compression, default instructions are removed from the very long instruction word and may be thought of as being compressed down to a zero bit instruction word. The decompression system automatically generates default instructions for each processing unit that does not have a compressed instruction word in the instruction packet. These default instructions may be No_Operation (No_Op) instructions, but may also be customized default instructions for a particular application. For example, for a graphics processing system, the default instructions may cause a loop of instructions to be processed. The default instructions may also be downloaded into the processor so that the default instructions may be easily changed or customized. The compression system may also add a pad instruction, as described below.

Figure 3B:
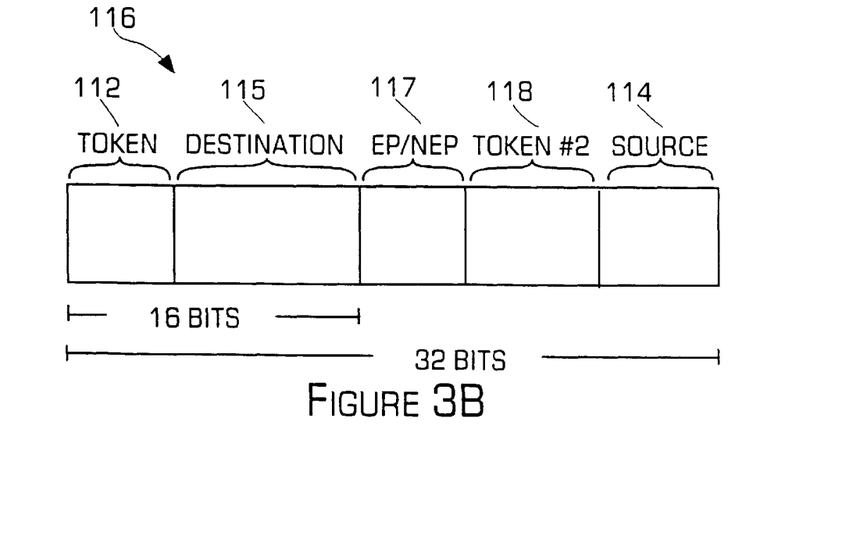

FIG. 3B is an example of a format of a 32-bit compressed instruction 116 in accordance with the invention. As shown, this 32-bit compressed instruction may have a token field 112, a source register field 114, and a destination register field 115, as described above, that contain the same type of data. However, for any compressed instruction longer than 16 bits, the location of the end of packet indicators that indicate whether the compressed instruction is the last compressed instruction within a packet has been moved. As shown, there may be a end-of-packet (EP)/not-end-of-packet (NEP) field 117 and a second token field 118 in the longer compressed instruction. The EP/NEP field permits the system to determine whether the particular compressed instruction is at the end of a compressed instruction packet, and performs the same function as the stop bit 113 in the 16 bit long compressed instruction.

For these longer compressed instructions, the token field 112 contains an op_code that indicates to the system that the compressed instruction is longer than 16 bits and that the compressed instruction should be routed to the appropriate functional unit. Since this decompression hardware processes the compressed instructions on 16-bit boundaries, the hardware next reviews the EP/NEP field that indicates whether the instruction is the end of the packet. For a 64 bit long compressed instruction, there may be an EP/NEP field at the beginning of the second and fourth 16 bit portions of the compressed instruction. The second token field 118 may contain the actual token that indicates the actual operations to be performed by the functional unit. The use of the EP/NEP field permits the decompressor to easily locate the end of packet indicator regardless of the length of the compressed instruction. Now, an example of compression in accordance with the invention will be described.

Figure 4:
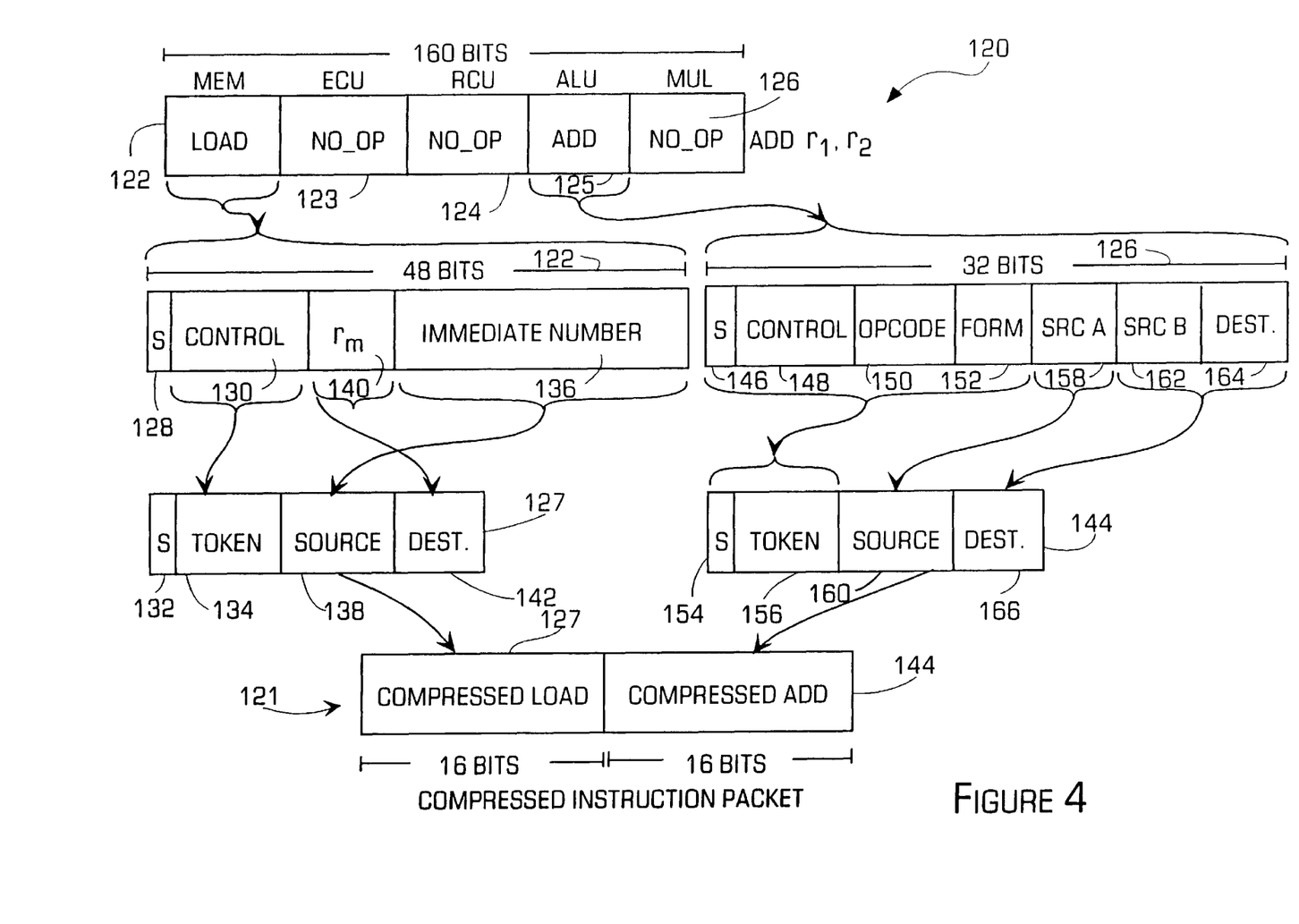
FIG. 4 is a diagram showing how an uncompressed very long instruction word may be compressed.

FIG. 4 is a diagram of an uncompressed very long instruction word (VLIW) 120, and a corresponding compressed instruction packet 121 in accordance with the invention. The very long instruction word 120, may be compressed, in accordance with the invention, by a compiler or an assembler. As shown in this example, the uncompressed instruction word may cause an ADD operation in which the contents of register 1 are added to those of register 2 to occur within the processor. To complement the ADD instruction, a LOAD register from memory instruction may be completed by the MEM unit, and an ADD instruction may be completed by the ALU unit. Thus, as shown, the MEM_CTRL word 122 contains a LOAD instruction that is 48-bits long, the ALU_CTRL word 125 contains an ADD instruction that is 32-bits long, and the control words for the other processing units are No_Operation (No_Op) or default instructions. These No_Operation (No_Op) or default instruction words 123, 124, and 126 are 32-bits long for the ECU, 16-bits long for the RCU unit, and 32-bits long for the MUL unit. Thus, the total number of bits required for this uncompressed very long instruction word is 160 bits even though only two processing units are being used.

To compress this very long instruction word, several different actions occur. First, the default or No_Operation instructions are compressed down to zero-bit length instructions. In essence, the default and No_Operation instructions are being removed from the very long instruction word since these instructions may be reinserted by the decompression system, as described below. Thus, the very long instruction word without the default instructions, in this example, has only the MEM instruction 122 and the ALU instruction 126 and is 80-bits long. Now, the MEM and ALU instructions are compressed to further reduce the length of the instruction packet.

The 48-bit MEM uncompressed instruction 122 is compressed into a 16-bit compressed MEM instruction 127, as shown. The stop bit 128 and the control bits 130 of the uncompressed instruction are compressed into the 6 bit stop bit and token field 132, 134. The token field 134 does not need a stop bit 132 in this example since the MEM instruction is not the last instruction in the instruction packet. A 32-bit immediate number 136 in the uncompressed instruction is compressed down to fit in the 5-bit source register field 138, and the 5-bit register address 140 is placed in the destination register field 142. Thus, the compressed MEM instruction 127 is 16-bits long.

The 32-bit ALU instruction 126 is also compressed into a 16-bit compressed instruction 144 that has a stop bit 154 and a token field 156, a source register field 160, and a destination register field 166. As above, a stop bit 146, control bits 148, an op code 150, and form bits 152, a total of 12 bits, are compressed and placed into the stop bit 154 and token field 156. Similarly, the source register and destination register fields 160, 166 are also generated. The token, source register, and destination register fields are then combined to form the compressed instruction 144. Then, the two compressed instructions 127, 144 are combined together to form the instruction packet 121 that is 32-bits long. For a very long instruction word with more uncompressed instructions and fewer No_Op instructions, the instruction packet would be longer and would contain more compressed instructions. For example, this 32-bit compressed instruction packet 121 may be stored in the instruction memory instead of the 160-bit uncompressed very long instruction word. The amount of compression achieved depends on the instructions being compressed. However, to achieve the largest amount of compression, the instructions that are most frequently used are preferably assigned the smallest compressed instruction. Thus, as shown above, an ADD instruction, which is common in most programs, is compressed from 32 bits to 16 bits. The invention is not limited to any particular assignment scheme.

In operation, a program contains a sequence of many very long instruction words (VLIW) that occupies a predetermined amount of memory space. Each individual VLIW is compressed, as described above, into a compressed instruction packet that may be 16-bits long to 128-bits long depending upon the number of compressed instructions in the instruction packet. Each of these compressed instruction packets is then placed into sequential memory locations so that the space, occupied in a memory, of a program with these compressed instructions packets is significantly less than the memory space occupied by the original program. Thus, the program is compressed into compressed instruction packets so that usage of available memory space is maximized. Then, the decompression system, as described below, decompresses the sequence of compressed instruction packets back into VLIWs just prior to execution by the processing units.

Figure 5:
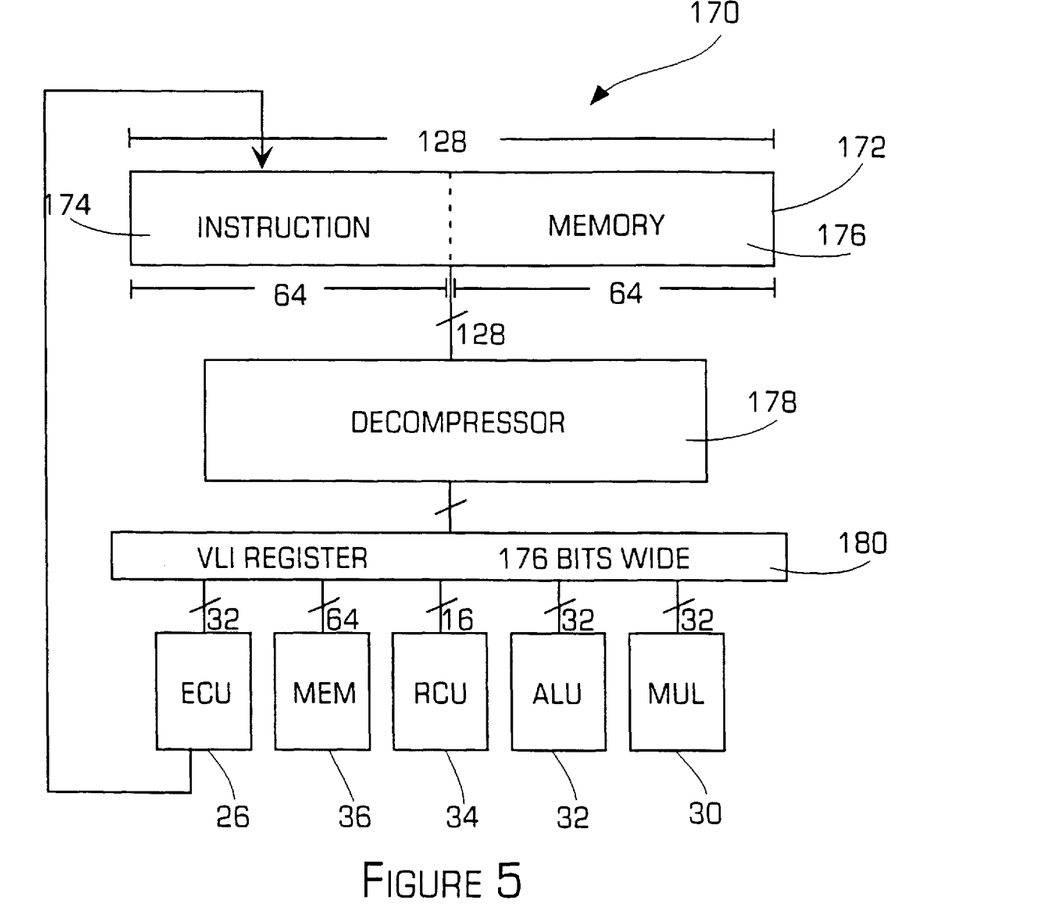
FIG. 5 is a block diagram of a very long instruction word (VLIW) decompression system in accordance with the invention.

FIG. 5 is a block diagram of a decompression system 170 in accordance with the invention that decompresses the compressed instruction packets prior to execution by VLIW processor 20. The decompression system may be located within the ECU, for example. The decompression system 170 may access an instruction memory 172 that may be 128-bits wide. The instruction memory may contain a plurality of compressed instruction packets. The width of the instruction memory may be selected to be any desired size without departing from the scope of the invention. These compressed instruction packets may contain a compressed instruction for each one of the processing units shown in FIG. 1, unless a Default instruction exist. The instruction memory may be made up of a first 64-bit memory 174, and a second 64-bit memory 176. The instruction memory 172 is controlled by the ECU 26. Every clock cycle, 128 bits, for example, may be read out from the instruction memory into a decompressor 178 that determines which bits make up the current instruction packet, decompresses the compressed instructions within the instruction packet, and outputs a 160-bit wide very long instruction word that has uncompressed instructions for every processing unit. Briefly, the decompressor 178 separates the compressed instructions in the instruction packet, and then decompresses each compressed instruction and applies it to its corresponding processor. To decompress each compressed instruction, the token field, the source register field and destination register field are expanded, and the expanded data is combined together to form an uncompressed instruction word. Each of these uncompressed instruction words and any default instructions are then combined together to form the 160-bit very long instruction word. The operation of the decompressor will be described below in more detail.

The 160-bit very long instruction word from the decompressor is read into a very long instruction register 180 that may be 160-bits wide. The very long instruction register stores the uncompressed 160-bit very long instruction word and also routes the instructions to each individual processing unit. The routing of the instructions to the processing units may also be done by the decompressor. As shown, the very long instruction register routes a 32-bit instruction word to the ECU 26, a 48-bit instruction word to the MEM unit 36, a 16-bit instruction to the RCU unit 34, a 32-bit instruction to the ALU 32, and a 32-bit instruction word to the MUL unit 30. The more detailed operation of the very long instruction register will be described below. Thus, in operation, a compressed instruction packet, that may be 16-bits to 128-bits long, is decompressed back into a 160-bit very long instruction word that is then routed to each of the processing units. This decompression unit, in combination with the compression system, may reduce the amount of memory required to store a very long instruction word and permit a program that is larger to be stored in the instruction memory. Now, more details about the decompression system are described.

Figure 6:
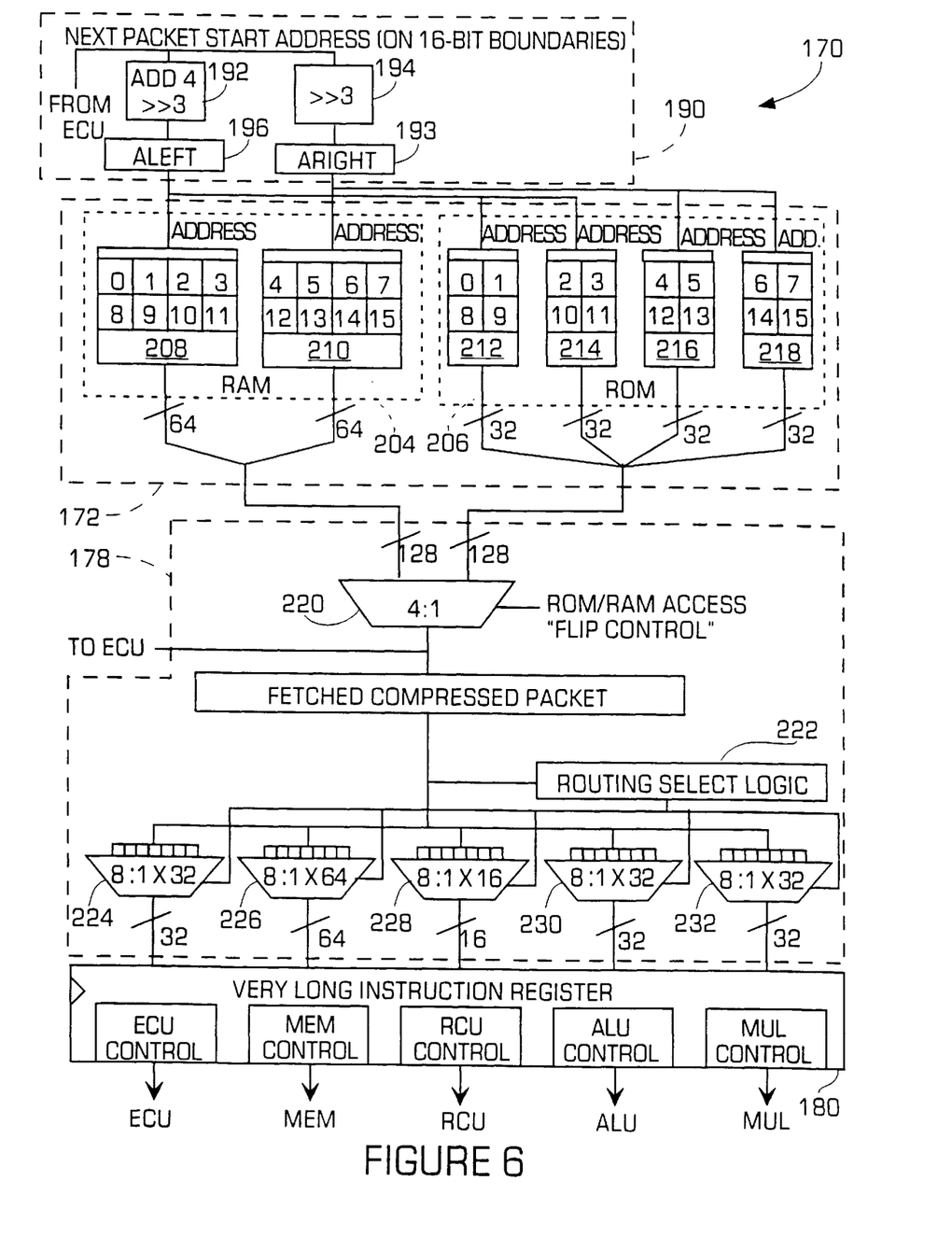
FIG. 6 is a more detailed block diagram of the VLIW decompression system shown in FIG. 5.

FIG. 6 is a more detailed diagram of the decompression system 170 in accordance with the invention. The decompression system, as described above, may include the instruction memory 172, the decompressor 178, and the very long instruction register 180. The decompression system 170 may also include an address generator 190. The address generator may generate a Next_Packet_Start address from a start address provided by the ECU unit. If the instruction memory is actually two memory portions, as described above, then the address generator may also generate a first address (ALEFT) for addressing the first memory, and a second address (ARIGHT) for addressing the second memory. In order to generate the ALEFT address, an offset circuit 192 may add 4 to the start address and may shift the bits of the start address right three places. The shifted ALEFT address may then be stored in an ALEFT register 196. Similarly, the ARIGHT address may be generated using a second offset circuit 194 that may shift the bits of the start address to the right by three places. The ARIGHT address may be then stored in an ARIGHT register 198.

The instruction memory 172, in this embodiment, may be a total of 128-bits wide. However, a 128-bit wide memory may not practical to manufacture so smaller memories may be logically connected together to form the 128-bit wide memory. As shown, the instruction memory may be both a random access memory (RAM) 204 and a read only memory (ROM) 206. The instruction memory may also be only a RAM or only a ROM. For the RAM 204, the 128-bit wide memory may be implemented as a first 64-bit memory 208, and a second 64-bit memory 210. The first and second memories are divided into 16-bit portions that are labeled consecutively. As shown, the addressing scheme, that will be described below in more detail, addresses both of the memories as a single 128-bit memory, so that the two 64-bit outputs from the memories are combined into a single 128-bit data stream. If the ROM 206 instruction memory is utilized, the 128-bit instruction memory may be implemented as four 32-bit wide ROMs 212, 214, 216, and 218. As with the RAMs, the ROMs are addressed as a 128-bit wide memory, and the separate 32-bit outputs from each ROM is combined together to form a 128-bit output.

The output from the RAMs 208, 210, and the output from the ROMs 212, 214, 216, and 218 both enter a selector 220, within the decompressor 178, that selects whether RAM data is being accessed or whether ROM data is being accessed. The output of the selector, which is a single 128-bit wide data stream containing at least one variable length instruction packet with compressed instructions. The fetched variable length instruction packet may then enter a routing select logic unit 222 that may decompress the compressed instructions within the instruction packets. The 64 bit portions of the data from the RAMs and ROMs may also be swapped, as described below so that the 128 bit long data stream may start in either of the 64-bit memory blocks. This swapping reduces the hardware necessary for decompression because a separate decoder for data stream starting in either the first and second memory block are not required. The routing select logic unit may be a programmed logic array (PLA). The routing select logic may also route the uncompressed instructions to the appropriate processing units, as described below.

To decompress the compressed instructions, the routing select logic 222 receives the incoming instruction packet stream and may determine that an instruction packet has ended because the routing select logic locates the end-of-packet indicator (the stop bit or the ep/nep bits) in the last compressed instruction of the instruction packet, as described above. The routing and select logic 222 separates the compressed instructions within the instruction packet after determining the end of the instruction packet, and inserts any default instructions as well. Thus, if the routing and select logic detects that the first compressed instruction in the instruction packet is the end of the packet, then that instruction is decompressed and a default instruction is generated for all of the other processing units. In this embodiment, the minimum size of an instruction packet is 16 bits so that even an instruction packet containing default instructions for all of the processing units is 16-bits long.

Each compressed instruction that is not a default instruction may be decoded by first comparing the token in the compressed instruction to all of the tokens within the VLIW processor and generating a corresponding uncompressed instruction op code. The assignment of tokens to certain uncompressed instructions is conducted by the compression system, as described above. Once the appropriate uncompressed instruction op code, is determined, it is temporarily stored. Then, the routing and select logic reads the source register field, as described above, and generates a source register address that address one of the thirty-two registers in the system. Next, the routing and select logic reads the destination register field and generates a destination register address corresponding to one of the registers available. The routing and select logic then combines the op code, the source register address, the destination register address and any additional bits together to form an uncompressed instruction. After each of the compressed instructions is decompressed, and any default instructions are generated, the routing and select logic 222 routes the uncompressed instructions to each of the processing units by controlling a plurality of multiplexers 224, 226, 228, 230, and 232. The instructions are temporarily stored in the very long instruction register 180. For example, the instruction word in the very long instruction word for the ECU unit is routed to the ECU multiplexer 224 because the routing and select logic selectively enables only that multiplexer. Similarly, each of the uncompressed instructions is routed to the appropriate processing unit.

Figure 7:
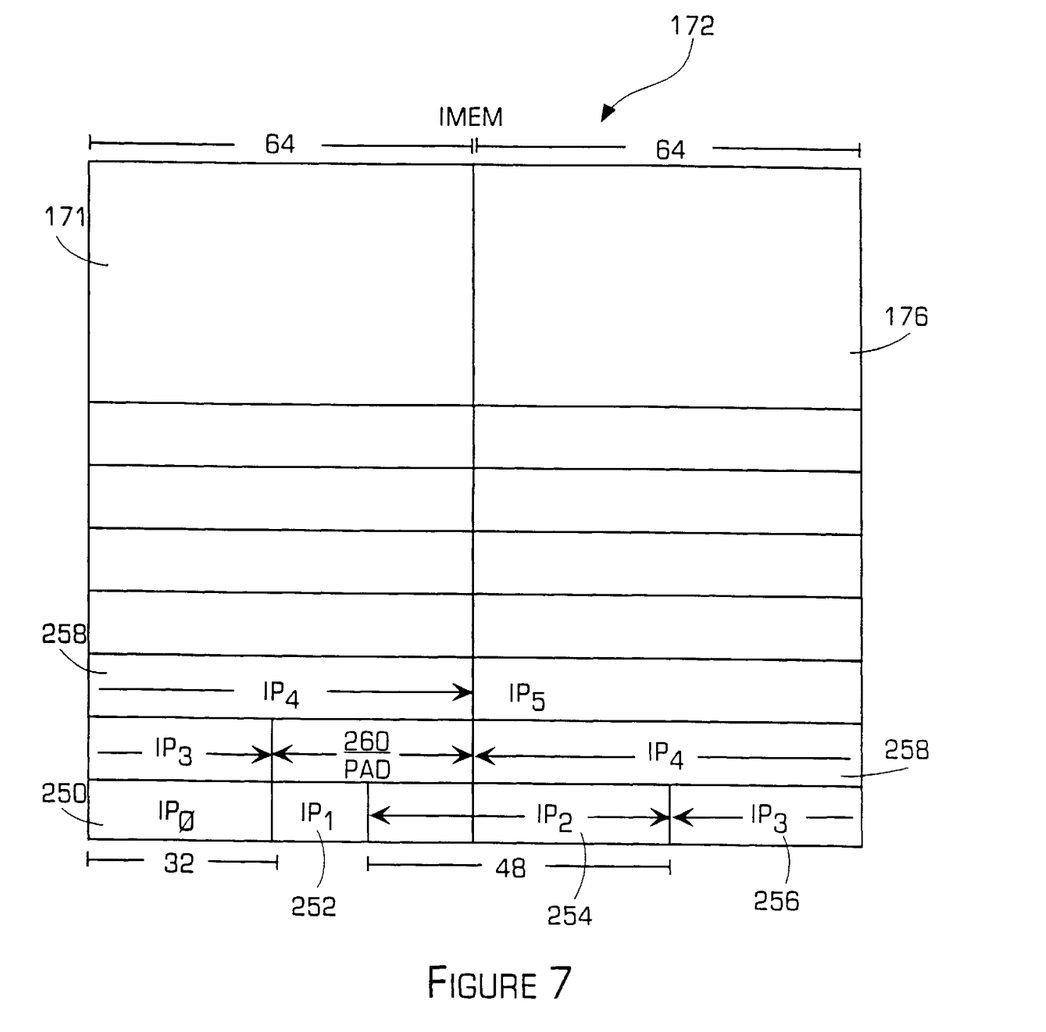
FIG. 7 is a diagram showing an instruction memory containing a plurality of instruction packets.

FIG. 7 is a diagram of the instruction memory 172 with a plurality of compressed instruction packets. As described above, the instruction memory may comprise the first memory 174 that may be 64-bits wide and the second memory 176 that may also be 64-bits wide. A plurality of instruction packets, that contain a plurality of compressed instructions are stored in the instruction memory. As described above, 128 bits are read out of the instruction memory each clock cycle. In many cases, the 128 bits may contain more than one instruction packet since the length of the instruction packets varies. The addressing scheme for this system will be described below with reference to FIG. 8. A first instruction packet 250, labeled IP0, may be 32-bits long and may be aligned arbitrarily at any 16-bit boundary in the instruction memory. Thus, the IP0 packet may start on any 16-bit boundary (i.e., at 0-bits, 16-bits, 32-bits, 48-bits, 64-bits, 80-bits long, 96-bits, or 112-bits) in the instruction memory. Any instruction packet that is equal to or less than 80-bits long (i.e., 80, 64, 48, 32, or 16 bits in the embodiment shown) may be arbitrarily aligned on 16-bit boundaries within the instruction memory. Any instruction packet that is larger than 80 bits (i.e., 96, 112, or 128 bits for the embodiment shown), as described below, must be started or aligned at only certain addresses in the instruction memory.

After the first clock cycle in which the instructions in IP0 are executed, the next instruction packet 252, which is labeled IP1 and is 16-bits wide, is read by the ECU at the same time as the IP0 instruction, but is not decompressed and executed until the second clock cycle. A third instruction packet 254, labeled IP2, may be 48-bits long and crosses the boundary between the first memory and second memory. However, in this system, the first and second memories are addressed in parallel to retrieve 128 bits so that instruction packets may cross the boundary between the memories. A fourth instruction packet 256, labeled IP3, is 64-bits wide and crosses the 128-bit boundary of the memory and has to be continued in the next memory location. In order to correctly read any instruction packet out of the instruction memory that crosses the 128-bit boundary, the first memory must be addressed with an address one greater that the address on the second memory so that the data in the second memory is read out first, and then the data in the first memory is read out, which swaps the memory blocks, as described above. The system for addressing the second memory and the first memory will be described below.

A fifth instruction packet 258, labeled IP4, is 128-bits long, and may not be arbitrarily aligned. For any instruction packet that is 128 bits long, the instruction packet may only start at either the beginning of the instruction memory (bit-0) or at the middle of the memory (bits 64). This alignment is required because, for example, if the 128-bit instruction packet is aligned at the 16-bit boundary, then the instruction packet will occupy first memory addresses 16–64, second memory addresses 65–128, and first memory addresses 0–16. The hardware addressing system can not easily address the instruction packet since two different parts of the instruction packet are contained in the first memory.

An example of the allowed assignments for various length instruction packets for the embodiment shown will be described. A 128 bit long packet may start either at memory address 0 or 64. A 112 bit long packet may start at memory address 0, 16, 64, or 80. A 96 bit long packet may start at memory address 0, 16, 32, 64, 80, or 96. An instruction packet that is 80 bits long or shorter (i.e., 80, 64, 48, 32, or 16 bits) may start at memory address 0, 16, 32, 48, 64, 80, 96, 112, or 128.

To ensure that instruction packets larger than 80 bits are properly aligned within the instruction memory, a pad instruction 260 is provided that is used to ensure that the long instruction packets start at the appropriate boundary. The pad instruction is inserted into the instruction packet stream by the compression system and is then discarded by the decompression system. The pad instruction does not cause any operation to occur in the processing units. Now the system for the addressing of the first and second memory to accomplish the reading out of the instruction packets will be described.

Figure 8:
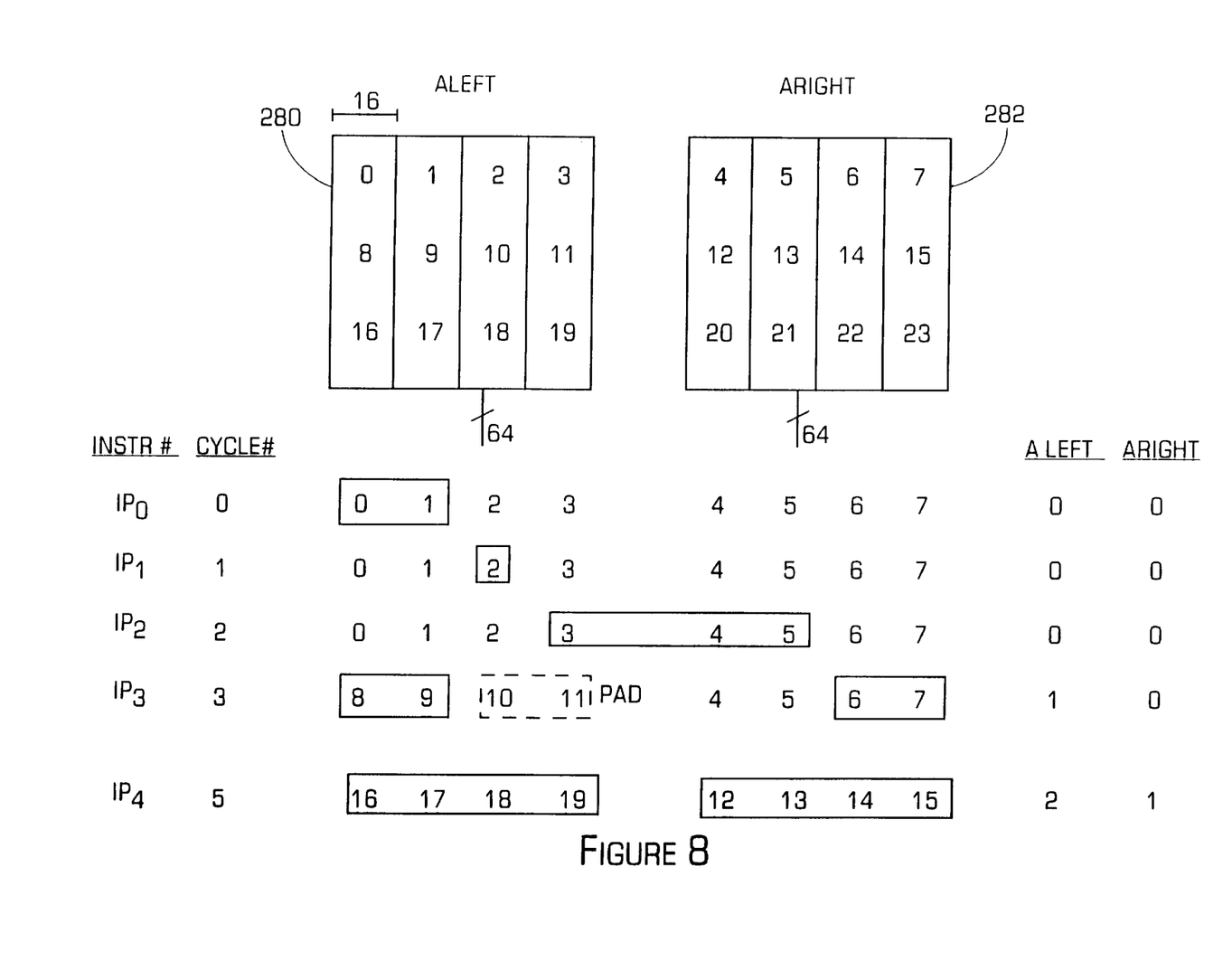
FIG. 8 is a diagram of instruction memory blocks showing the addressing of these memory blocks in accordance with the invention.

FIG. 8 is a diagram showing the addressing system for reading instruction packets out of the first memory and second memory. A memory map 280 of the first memory and a memory map 282 of the second memory are shown. These memory maps are divided into 16-bit segments because that is the smallest size of instruction packet. As shown, the first memory location has addresses 0,1,2, and 3 corresponding to four 16-bit segments, second memory has addresses 4,5,6, and 7, first memory has addresses 8,9,10, and 11, and so on. Thus, the first and second memories are addressed as one large 128-bit memory.

The first time that a 128-bit portion of the instruction memory is read from the memories at clock cycle 0, the Aleft and Aright addresses are both zero which means that addresses 0,1,2,3,4,5,6 and 7 are able to be read out. For IP0, as described above, addresses 0 and 1, corresponding to a 32-bit instruction packet, are read out and decompressed. Then, the addressing system determines that the next instruction packet, IP1, is only 16 bits and the memory do not need to be incremented. Thus, the Aleft and Aright addresses remain at zero. Instruction packet IP1 is then read out of the instruction memory, decompressed and executed. Since IP2 is only 48-bits long, the addressing system does not increment either of the Aright or Aleft addresses and IP2 is read out. The addressing system, however, determines that IP3 crosses the 128-bit boundary, so the Aleft address is incremented by one so that addresses 8,9,10, and 11 may be accessed. Thus, IP3 is read out of locations 6,7,8, and 9. To read out IP3, the data in the second memory is read out first and then the data in the first memory is read out.

The addressing system then determines that the next instruction packet, IP4 is 128-bits long and also has a pad instruction in front of it. As the addressing system encounters the pad instruction, it reads out the pad instruction and discards it. Then, because the next instruction packet is 128-bits long, both the Aright and Aleft addresses are incremented so that the processor may access addresses 16, 17, 18, 19, 12, 13, 14, and 15. In this case, the instruction packet must be read out of the second memory first (i.e., addresses 12, 13, 14, and 15) and then out of first memory (i.e., addresses 16, 17, 18, and 19). Any time that an instruction packet starts in the second memory, which may be when the instruction packet crosses the 128-bit boundary, the data from the second memory is read out with an address that is one less than that of first memory so that the data in the first memory is processed first.

Figure 9:
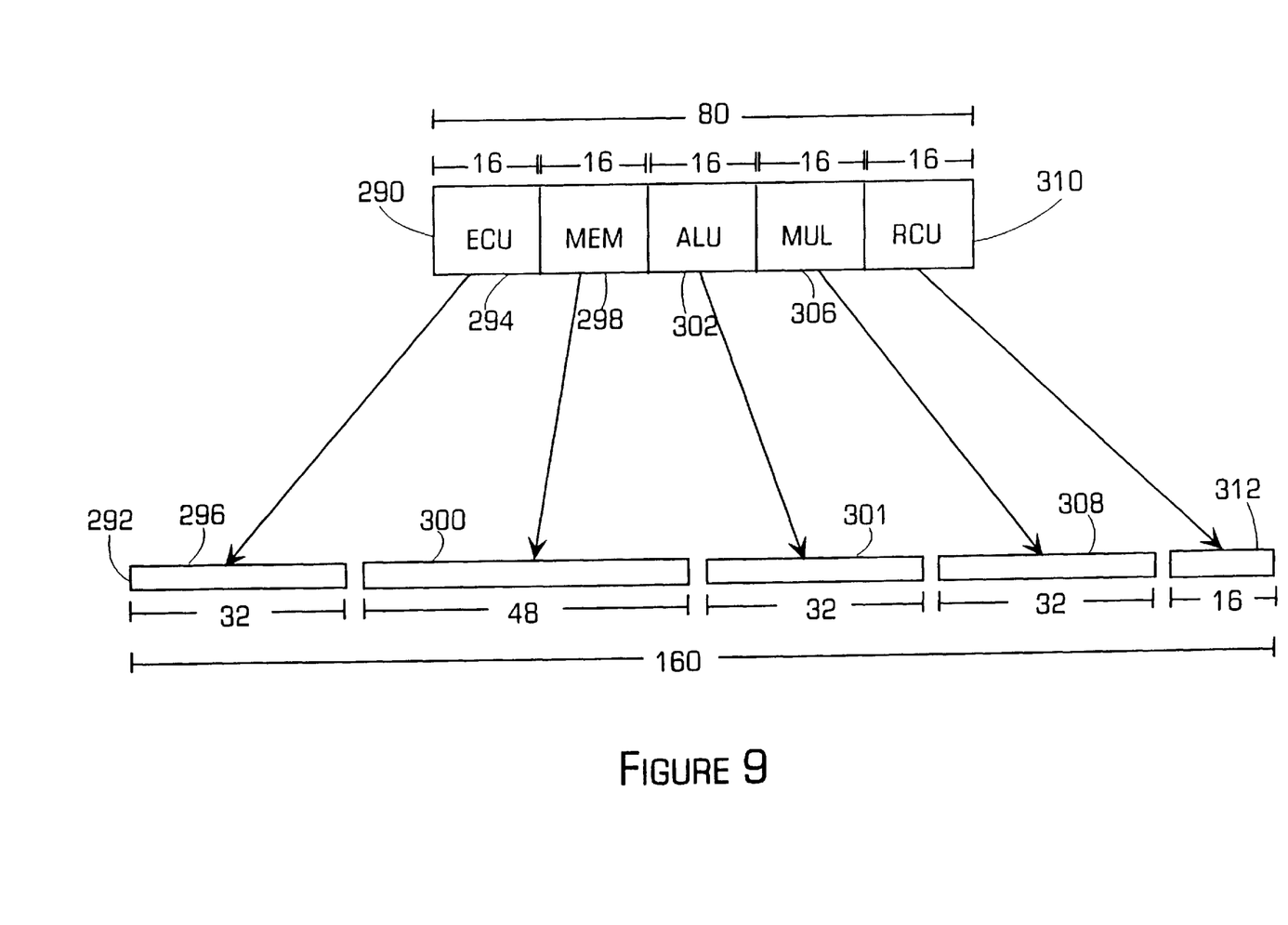
FIG. 9 is a diagram showing the decompression of a compressed VLIW instruction packet into a uncompressed very long instruction word in accordance with the invention.

FIG. 9 is a diagram showing a compressed instruction 290 being decompressed into a very long instruction word 292. As shown, the compressed instruction packet is only 80-bits long and contains compressed instructions for each of the processing units and the very long instruction packet is 160-bits long. As described above, a 16-bit ECU compressed instruction 294 is decompressed into a 32-bit ECU instruction 296. A 16-bit MEM compressed instruction 298 is decompressed into a 48-bit MEM instruction 300. A 16-bit ALU compressed instruction 302 is decompressed into a 32-bit ALU instruction 304. Similarly, a 16-bit MUL compressed instruction 306 is decompressed into a 32-bit MUL instruction 308, and a 16-bit compressed RCU instruction 310 is decompressed into a 16-bit RCU instruction 312. Thus, the compression and decompression system, in accordance with the invention, may greatly reduce the amount of memory required to store a very long instruction packet.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. A system for compressing and decompressing variable length instructions contained in very long instruction word packets for a processor having a plurality of processing units, each very long instruction word packet comprising an instruction for each of said processing units, the system comprising:

means for storing a plurality of said variable length instruction packets in a plurality of storage locations, each instruction packet containing compressed instructions for associated ones of said processing units;

means for accessing and retrieving a selected variable length instruction packet from the storing means;

means for parsing said variable length instruction packet into said compressed instructions;

means for decompressing each of said compressed instructions to generate a variable length instruction for each of said associated processing units; and means for routing said variable length decompressed instructions from said decompression means to said associated processing units.

2. The system of claim 1, wherein the accessing and retrieving means comprises an address generator means for offsetting a start address based on the length of said variable length instruction packet to generate an instruction packet address, and means for storing said instruction packet address.

3. The system of claim 2, wherein the storing means comprises a first memory and a second memory, and wherein the instruction packet address comprises a first address for addressing said first memory, and a second address for addressing said second memory so that the selected instruction packet is read from said first memory and then from said second memory.

4. The system of claim 3, wherein a first portion of the instruction packet is stored in said second memory and a second portion of the instruction packet is stored in said first memory so that the instruction packet overlaps a boundary of said second memory, and wherein the address generator comprises means for reading the instruction packet from said second memory and then from said first memory.

5. The system of claim 1, wherein the compressed instruction comprises a token field, a source register field and a destination register field, and wherein the uncompressed instruction generation means comprises means for generating an operation code from said token field, means for generating a source register address from said source register field, means for generating a destination register address from said destination register field, and means for combining said operation code, said source register address and said destination register address to form said uncompressed instruction.

6. The system of claim 5, wherein tokens have different lengths, and a token having a shorter length is assigned to an uncompressed instruction that occurs more frequently.

7. The system of claim 1, wherein said decompression means comprises means for generating decompressed default instructions for an associated processing unit that does not have a compressed instruction in said variable length instruction packet.

8. The system of claim 7, wherein the default instruction generation means comprises means for selectively changing said default instructions for each of said processing units.

9. The system of claim 1, wherein said variable length instruction packet comprises an end of packet indicator, and wherein said accessing and retrieving means comprises means for detecting said end of packet indicator.

10. The system of claim 1, wherein the variable length instruction packets have a pad instruction for adjusting the length of an instruction packet, and the parsing means comprises means for removing said pad instruction from said variable length instruction packet.

11. The system of claim 1, wherein the routing means comprises a plurality of multiplexers attached to said processing units, and means for selectively enabling said multiplexers so that the instructions are routed to associated processing units.

12. A method for compressing and decompressing variable length instructions contained in very long instruction word packets for a processor having a plurality of processing units, each very long instruction word packet comprising an instruction for each of said processing units, the method comprising:

storing a plurality of said variable length instruction packets in a plurality of storage locations, each instruction packet containing compressed instructions for associated ones of said processing units;

accessing and retrieving a selected variable length instruction packet from the storing means;

parsing said variable length instruction packet into said compressed instructions;

decompressing each of said compressed instructions to generate a variable length instruction for each of said associated processing units; and routing said variable length decompressed instructions from said decompression means to said associated processing units.

13. The method of claim 12, wherein the accessing and retrieving comprises offsetting a start address based on the length of said variable length instruction packet to generate an instruction packet address, and storing said instruction packet address.

14. The method of claim 13, wherein the storing comprises using a first memory and a second memory, and wherein the instruction packet address comprises a first address for addressing said first memory, and a second address for addressing said second memory so that the selected instruction packet is read from said first memory and then from said second memory.

15. The method of claim 14, wherein a first portion of the instruction packet is stored in said second memory and a second portion of the instruction packet is stored in said first memory so that the instruction packet overlaps a boundary of said second memory, and wherein the address generation comprises reading the instruction packet from said second memory and then from said first memory.

16. The method of claim 12, wherein the compressed instruction comprises a token field, a source register field and a destination register field, and wherein the uncompressed instruction generation comprises generating an operation code from said token field, generating a source register address from said source register field, generating a destination register address from said destination register field, and combining said operation code, said source register address and said destination register address to form said uncompressed instruction.

17. The method of claim 16, wherein tokens have different lengths, and a token having a shorter length is assigned to an uncompressed instruction that occurs more frequently.

18. The method of claim 12, wherein decompression comprises generating decompressed default instructions for an associated processing unit that does not have a compressed instruction in said variable length instruction packet.

19. The method of claim 18, wherein the default instruction generation comprises selectively changing said default instructions for each of said processing units.

20. The method of claim 12, wherein said variable length instruction packet comprises an end of packet indicator, and wherein accessing and retrieving comprises detecting said end of packet indicator.

21. The method of claim 12, wherein the variable length instruction packets have a pad instruction for adjusting the length of an instruction packet, and parsing comprises removing said pad instruction from said variable length instruction packet.

22. The method of claim 12, wherein the routing comprises using a plurality of multiplexers attached to said processing units, and selectively enabling said multiplexers so that the instructions are routed to associated processing units.

23. A system for compressing and decompressing variable length instructions contained in very long instruction word packets for a processor having a plurality of processing units, each very long instruction word packet comprising an instruction for each of said processing units, the system comprising:

means for generating a very long instruction word packet containing instructions for corresponding ones of said processing units;

means for assigning a compressed instruction code to each instruction within the instruction packet, the codes having different lengths and a shorter compressed instruction code being assigned to more frequently occurring instructions; and     means for combining the compressed instruction codes for each instruction to generate an instruction packet having compressed instructions for corresponding ones of said processing units.

24. The system of claim 23, wherein the instructions comprise an operations code, a source register address, and a destination register address, and wherein the assigning means comprise means for generating a token field from said operations code, means for generating a source register field from said source register address, means for generating a destination register field from said destination register address, and further comprising means for combining said token field, said source register field and said destination register field into said compressed instruction.

25. The system of claim 24, wherein the combining means comprises means for adding an end of packet indicator into the last compressed instruction within said instruction packet.

26. The system of claim 23, wherein the assigning means comprises means for removing a default instruction from said very long instruction word packet by assigning a zero length compressed instructions to said default operation.

27. The system of claim 23, wherein the compressed instruction generation means comprises means for inserting a plurality of pad bits in the compressed instruction packet so that the compressed instruction packet is correctly aligned in an instruction memory.

28. A method for compressing and decompressing variable length instructions contained in very long instruction word packets for a processor having a plurality of processing units, each very long instruction word packet comprising an instruction for each of said processing units, the method comprising:

generating a very long instruction word packet containing instructions for each of corresponding ones of said processing units;

assigning a compressed instruction code to each instruction within the very long word instruction packet, the codes having different lengths and a shorter compressed instruction code being assigned to more frequently occurring instructions; and     combining the compressed instruction codes for each instruction to generate an instruction packet having compressed instructions for corresponding ones of said processing units.

29. The method of claim 28, wherein the instructions comprise an operations code, a source register address, and a destination register address, and wherein the assigning comprise generating a token field from said operations code, generating a source register field from said source register address, generating a destination register field from said destination register address, and the assigning further comprising combining said token field, said source register field and said destination register field into said compressed instruction.

30. The method of claim 29, wherein combining comprises adding an end of packet indicator into the last compressed instruction within said instruction packet.

31. The method of claim 28, wherein the assigning comprises removing a default instruction from said very long instruction word packet by assigning a zero length compressed instructions to said default operation.

32. The method of claim 28, wherein the instruction generation comprises inserting a plurality of pad bits in the compressed instruction packet so that the compressed instruction packet is correctly aligned in an instruction memory.

33. A system for compressing and decompressing variable length instructions contained in very long instruction word packets for a processor having a plurality of processing units, each very long instruction word packet comprising an instruction for each of said processing units, the system comprising:

means for generating a very long instruction word packet containing instructions for corresponding ones of said processing units;

means for assigning a compressed instruction code to each instruction within the instruction packet, the codes having different lengths and a shorter compressed instruction code being assigned to more frequently occurring instructions;

means for combining the compressed instruction codes for each instruction to generate an instruction packet having compressed instructions for corresponding ones of said processing units;

means for storing a plurality of said variable length instruction packets in a plurality of storage locations, each instruction packet containing compressed instructions for associated ones of said processing units;

means for accessing and retrieving a selected variable length instruction packet from the storing means;

means for parsing said variable length instruction packet into said compressed instructions;

means for decompressing each of said compressed instructions to generate a variable length instruction for each of said associated processing units; and     means for routing said variable length decompressed instructions from said decompression means to said associated processing units.

34. A method for compressing and decompressing variable length instructions contained in very long instruction word packets for a processor having a plurality of processing units, each very long instruction word packet comprising an instruction for each of said processing units, the method comprising:

generating a very long instruction word packet containing instructions for corresponding ones of said processing units;

assigning a compressed instruction code to each instruction within the instruction packet, the codes having different lengths and a shorter compressed instruction code being assigned to more frequently occurring instructions;

combining the compressed instruction codes for each instruction to generate an instruction packet having compressed instructions for corresponding ones of said processing units;

storing a plurality of said instruction packets in a plurality of storage locations;

accessing and retrieving a selected instruction packet from the storing means;

parsing said instruction packet into said compressed instructions;

decompressing each of said compressed instructions to generate a variable length instruction for each of said associated processing units; and routing said variable length decompressed instructions from said decompression means to said associated processing units.

* * * * *